F. L. H. DANCHELL.
Peat Machine.

No. 47,162.

2 Sheets—Sheet 1.

Patented Apr. 4, 1865.

Witnesses:
H B Barlow
John Perkins

Inventor:
F. L. H. Danchell

AM. PHOTO-LITHO.CO.N.Y. (OSBORNE'S PROCESS.)

F. L. H. DANCHELL.
Peat Machine.
No. 47,162.
2 Sheets—Sheet 2.
Patented Apr. 4, 1865.
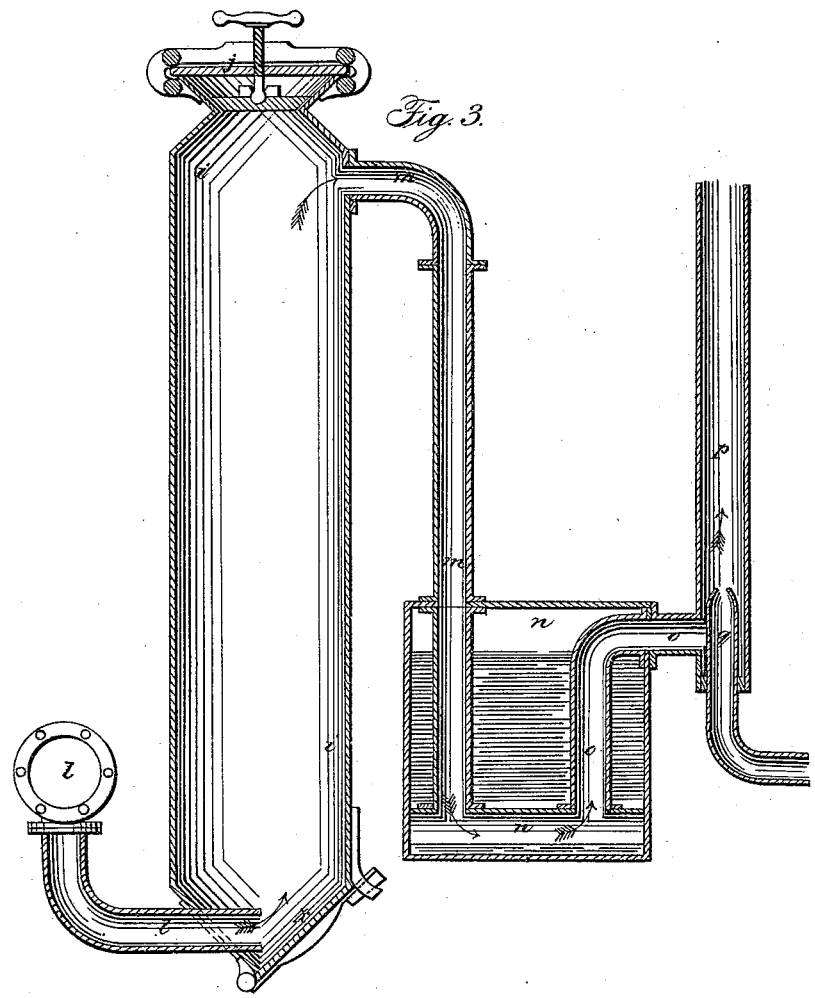
Witnesses:
Inventor:

UNITED STATES PATENT OFFICE.

FREDERICK LUDEWIG HAHN DANCHELL, OF LONDON, COUNTY OF MIDDLESEX, ENGLAND.

IMPROVEMENT IN DRYING AND CHARRING PEAT.

Specification forming part of Letters Patent No. 47,162, dated April 4, 1865.

*To all whom it may concern:*

Be it known that I, FREDERICK LUDEWIG HAHN DANCHELL, of 30 Great Ormond street, in the county of Middlesex, England, have invented certain new and useful Improvements in Apparatus for Drying and Charring Peat; and I hereby declare the following to be a full, clear, and exact description thereof, reference being had to the annexed drawings, forming part of this specification.

The nature of my invention consists, first, in drying blocks of peat placed on traveling bands or other surfaces passing through chambers by a current of air passing over them, and in causing the blocks to turn over in falling from one traveling band or other surface to another, in order to expose all sides of the blocks in turn to the action of the current of air.

My invention consists, secondly, in charring peat in closed vessels or retorts by conveying heated gases or the heated products of combustion to the interior thereof.

Figure 1:
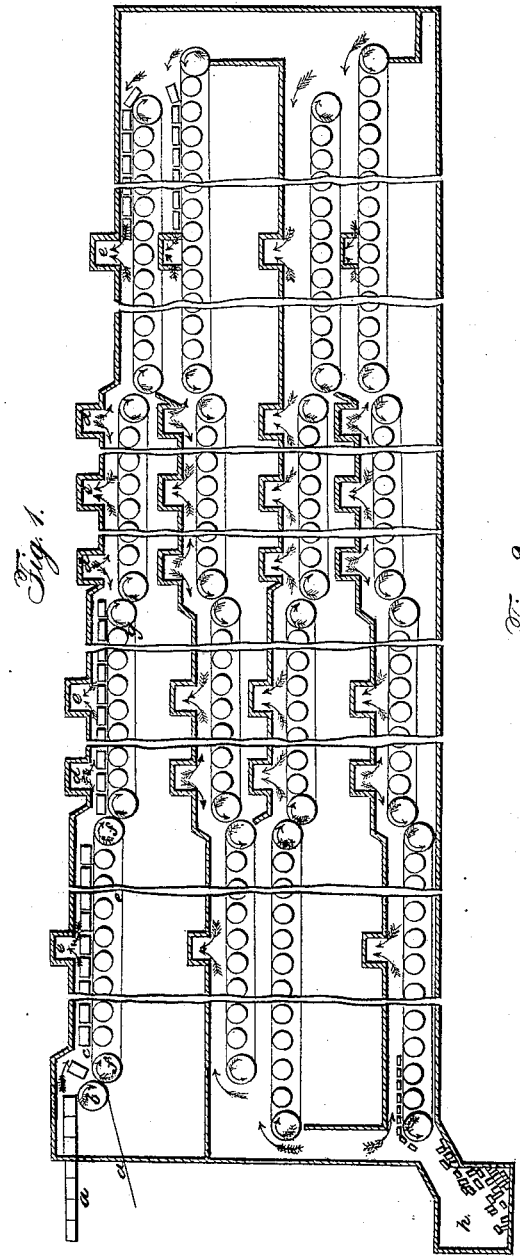
Figure 2:
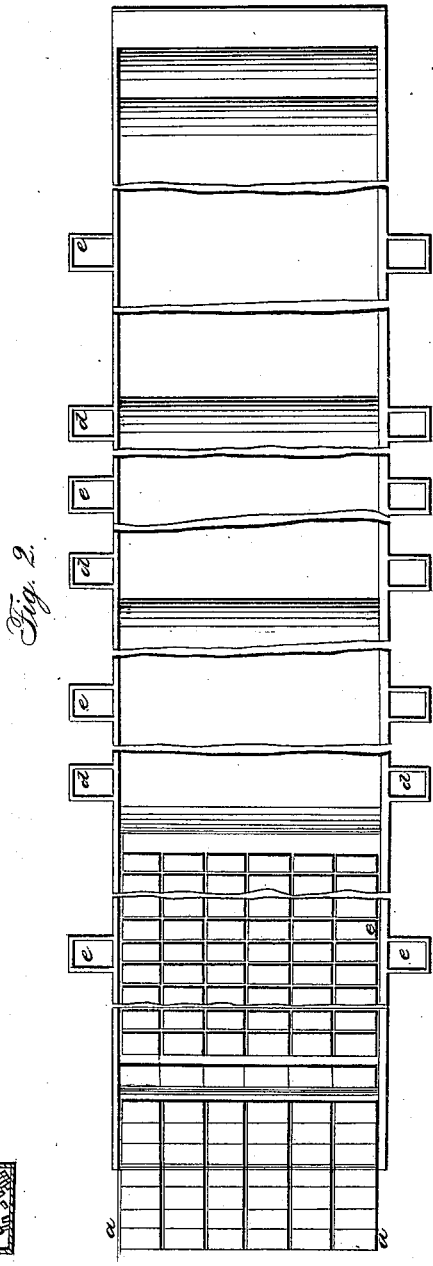

On Sheet 1, Figure 1 is a transverse section, and Fig. 2 a plan, of my improved apparatus for drying peat.

*a* represents an endless band for conveying the blocks of peat into the first or uppermost chamber of the apparatus. The belt *a* travels around the roller *b*, and the blocks in falling from the band *a* to the band *c* turn over so as to expose another part of their surface to the drying action of the current of air, which is admitted to the chambers by the side trunks *d* and drawn off through the trunks *e* by a fan, the draft of a chimney, steam-jets, or any other convenient mode of exhaustion, or the current may be produced by a blast of air from a fan or blowing-engine, entering at *d* and having its exit at *e*. The endless band *c* passes around the rollers *f*, and from it the blocks of peat fall onto the band *g*, being again turned over in their descent; and in like manner the blocks fall from one endless band to the other until they are finally deposited in a sufficiently dry state into the receptacle *h*. The rollers over and around which the endless bands pass are driven by gearing or straps and pulleys.

It will be seen on referring to Fig. 1 that the space between the top of the blocks of peat and the horizontal partitions which form the several chambers of the apparatus is very small. By this means the current of air is most advantageously, economically, and effectively applied to drying the peat, and the moisture, as it evaporates, is immediately carried off. The side trunks, *d*, for admitting the air to the apparatus, are in communication with an ordinary hot-air stove, or any convenient source of heat.

By the arrangement of the trunks *d* and *e*, as shown in the drawings, the evil of the air becoming overloaded with moisture, and so losing its desiccating properties, is avoided, and whatever the length of the apparatus, I recommend that the inlet-channels *d* and the exit-channels *e* be placed so near to one another that the same air shall not pass over more than fifteen feet in length of the wet peat as it lies on the bands. The length of the apparatus, the speed of the endless bands, and the temperature and quantity of the air for drying, must be regulated so that the wet peat, which is constantly entering at *a*, may by the time it arrives at *h* be dried to the degree required.

On Sheet 2, Fig. 3 is a vertical section of my improved apparatus for charring peat, either in the block after it has been dried in the apparatus above described or in any other form or manner.

*i* is a retort, furnished above with a lid *j*, which is held down by a screw or other convenient means, and below with a second lid, *k*, for the discharge of the charred peat. *l* is a pipe for supplying the heated gases or products of combustion from a furnace or other source to the lower end of the retort, and *m* is a pipe communicating from the upper end of the retort to the refrigerator *n*, from which another pipe, *o*, passes to the chimney *p*, in which a partial vacuum is formed by steam issuing from the blast-pipe *q*.

When the retort has been charged through the opening at the top, the lid *j* is closed and the valve is opened for supplying the gases or heated products of combustion through the pipe *l*, and a draft through the peat in the retort is produced by the blast-pipe *q*. The gases evolved by the peat are partially condensed in passing through the refrigerator *n*, in which a constant supply of cold water is kept up, and from whence the condensed products are drawn off by a tap, when required.

When it is desired to utilize the gases escaping through the pipe o from the retorts for illuminating or heating purposes, the heated gases or products of combustion by which the charring is effected may be forced instead of being drawn through the retorts by means of a jet, pump, or a fan. This mode of charring is also applicable to wood, bone, and other carbonaceous substances. By thus introducing the heated gases or the products of combustion into the retort instead of applying them externally, as heretofore customary, a great economy of fuel is effected.

What I claim herein as new, and desire to secure by Letters Patent of the United States, is—

1. The improved arrangement of the apparatus for drying blocks of peat, as shown and described in reference to Sheet 1, and particularly the arrangement of the endless bands and rollers, by which the blocks are turned over in passing from one set to the other.

2. The arrangement and distribution of the air-passages of the apparatus for drying peat.

3. The application of a steam blast for producing the requisite currents of air for drying and charring peat or other carbonaceous substances.

In testimony whereof I have hereunto set my hand before two subscribing witnesses.

F. L. H. DANCHELL.

Witnesses:
H. B. BARLOW,
JOHN PERKINS.